United States Patent Office 3,382,218
Patented May 7, 1968

3,382,218
VULCANIZATION ACCELERATORS
Kamal Naguib Ayad, Ruabon, Wrexham, Wales, assignor to Monsanto Chemicals Limited, London, England, a British company
No Drawing. Filed Feb. 18, 1965, Ser. No. 433,785
Claims priority, application Great Britain, Feb. 28, 1964, 8,355/64
3 Claims. (Cl. 260—79.5)

ABSTRACT OF THE DISCLOSURE

Thiomorpholino-carbodithioic acid derivatives having the formula:

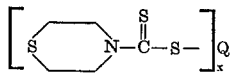

where Q represents a salt-forming atom or group and $x$ is an integer determined by the valence of Q; the group:

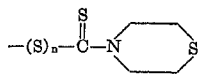

where $n$ is 0 or 1 and $x$ is 1; or the group:

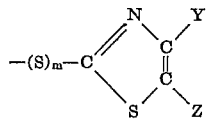

where $m$ is 0 or 1, $x$ is 1, Y and Z are each a substituent atom or group, or where Y and Z together with the carbon atoms to which they are shown linked form an aromatic ring; and where the thiomorpholine ring or rings can optionally contain one or more substituents accelerate the vulcanization of rubber.

This invention relates to new chemical compounds which are useful as accelerators in the vulcanization of rubber.

The new compounds of the invention are thiomorpholino-carbodithioic acid derivatives having the formula:

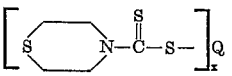

where Q represents a salt-forming atom or group and $x$ is an integer determined by the valence of Q; the group:

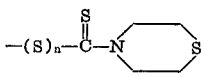

where $n$ is 0 or 1 and $x$ is 1; or the group:

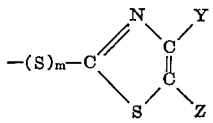

where $m$ is 0 or 1, $x$ is 1, Y and Z are each a substituent atom or group, or where Y and Z together with the carbon atoms to which they are shown linked form an aromatic ring; and where the thiomorpholine ring or rings can optionally contain one or more substituents.

The compounds where Q in the above formula represents a salt-forming atom or group are the salts of thiomorpholinocarbodithioic acids; those where Q represents the group:

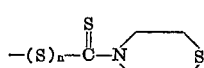

and $n$ is 0 or 1 are respectively the bis(thiomorpholinothiocarbonyl) mono- and di-sulfides; and those where Q represents the group:

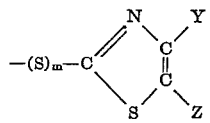

and $m$ is 0 or 1 are respectively thiomorpholinothiocarbonyl thiazolyl mono- and di-sulfides.

Salts obtained by the preparations described, infra, can function as starting materials for the production of other new compounds of this invention.

The invention includes a process for the vulcanization of rubber in which the new compounds of the invention are used as vulcanization accelerators.

The new compounds include the metal salts of the thiomorpholinocarbodithioic acids and the amine salts. Examples of the metal salts are those where the metal is an alkali metal, for instance sodium or potassium, the salts of the metals of Group II of the Periodic Table, for example the calcium, zinc and cadmium salts, and the salts of various other metals, for example nickel and manganese. Of the metal salts, those of zinc are particularly useful as vulcanization accelerators, while the alkali metal salts are especially useful as intermediates.

Of the ammonium or amine salts, those where the amine is a thiomorpholine, in particular the thiomorpholine from which the thiomorpholinocarbodithioic acid itself is derived are usually preferred. Amine salts where the amine is a tertiary aliphatic amine, for example triethylamine, are also readily accessible.

Where the carbodithioic acid derivative is a thiomorpholinothiocarbonyl thiazolyl mono- or di-sulfide, and each of Y and Z in the above formula represents a substituent atom or group, this substituent can be for example a halogen atom such as chlorine or bromine, an alkyl group for example a methyl or ethyl group, or an amino group. Preferred compounds are those in which Y and Z together with the two carbon atoms to which they are shown linked form an aromatic ring, especially the compounds where the aromatic ring is a benzene ring, that is to say the thiomorpholinothiocarbonyl benzothiazolyl mono- and di-sulfides. In such compounds, the aromatic ring is optionally substituted.

In compounds where the thiomorpholine ring or rings contain a substituent, this can be for example a hydrocarbon group, especially an alkyl group, or a halogen atom for instance chlorine. Preferred substituents are lower alkyl groups, for example methyl or ethyl groups.

Specific examples of the new compounds are: sodium thiomorpholinocarbodithioate; zinc thiomorpholinocarbodithioate; thiomorpholinium thiomorpholinocarbodithioate; bis(thiomorpholinothiocarbonyl) disulfide; bis (thiomorpholinothiocarbonyl) monosulfide; 2,6-dimethylthiomorpholinium (2,6 - dimethylthiomorpholino) carbodithioate; bis(2,6-dimethylthiomorpholinothiocarbonyl) disulfide; thiomorpholinothiocarbonyl benzothiazolyl monosulfide; and thiomorpholinothiocarbonyl benzothiazolyl disulfide.

A thiomorpholine salt of a thiomorpholinocarbodithioic acid is obtained simply by mixing carbon disulfide with the thiomorpholine at or near room temperature. For high yields, it is preferred to use stoichiometric proportions of the reactants, that is to say two mols. of the thiomorpholine per mol. of carbon disulfide, or proportions that do not differ appreciably from the stoichiometric.

A tertiary aliphatic amine salt can be obtained by a similar preparation in which one mol. of the thiomorpholine is replaced by one mol. of the tertiary amine.

Reaction occurs under similar conditions with one mol. of the thiomorpholine replaced by an equivalent amount of a secondary or primary amine, but the product is then often a mixture of salts.

If desired, the reaction mixture can in any instance be diluted with an inert solvent, which may be aqueous or organic.

An alkali metal salt of a thiomorpholinocarbodithioic acid is obtained by mixing carbon disulfide, the thiomorpholine and an aqueous solution of an alkali metal hydroxide. In a preferred method of operating, carbon disulfide is added to a stirred aqueous solution containing both the thiomorpholine and the alkali metal hydroxide. The preparation is conveniently carried out at or near ordinary room temperature, for example in the temperature range 10°–30° C. Preferably equivalent or near-equivalent quantities of the reactants are used. The initial product of the preparation is an aqueous solution of the alkali metal salt of the thiomorpholinocarbodithioic acid, from which the salt itself can, if required, be obtained by evaporating the solution.

The thiomorpholinocarbodithioates of the Group II–B metals are insoluble in water, and can therefore be obtained by the addition of a water-soluble Group II–B metal salt, for example zinc or cadmium sulfate, to an aqueous solution of an alkali metal thiomorpholinocarbodithioate, whereupon the product is precipitated and can be isolated by conventional procedures.

The bis(thiomorpholinothiocarbonyl) disulfides are also water-insoluble, and are obtained as precipitates by the action of a suitable oxidizing agent, for example chlorine or a water-soluble persulfate for example potassium or ammonium persulfate, on an aqueous solution of an alkali metal thiomorpholinocarbodithioate.

A bis(thiomorpholinothiocarbonyl) monosulfide is the principal product where a solution of an alkali metal thiomorpholinocarbodithioate is oxidized in the presence of a water-soluble cyanide, for example potassium cyanide.

Alternatively a bis(thiomorpholinothiocarbonyl) monosulfide can be prepared from the corresponding disulfide by the action of a cyanide on the latter. The reaction is suitably conducted in an aqueous-organic solvent medium in which the organic solvent is water-miscible, for example methanol, ethanol or acetone.

The water-insoluble metal salts and the mono- and disulfides referred to above can also be prepared from the amine salts of the corresponding thiomorpholinocarbodithioic acids, but the alkali metal salts are generally preferred as starting materials.

Thiomorpholinothiocarbonyl thiazolyl disulfides can be obtained by the condensation of the appropriate thiazolyl sulfur chloride with an anhydrous alkali metal salt of a thiomorpholinocarbodithioic acid, preferably in the presence of an inert solvent.

The corresponding monosulfides are conveniently prepared by the double decomposition of the appropriate thiazolyl disulfide with a bis(thiomorpholinothiocarbonyl) disulfide in the presence of a cyanide, for example potassium cyanide.

Of the new compounds of the invention, those preferred for use as vulcanization accelerators are the thiomorpholinium salts, certain water-insoluble metal salts, for example the zinc salts, the bis(thiomorpholinothiocarbonyl) mono- and di-sulfides, and the thiomorpholinothiocarbonyl benzothiazolyl mono- and di-sulfides.

The new compounds can be used in the vulcanization of natural and synthetic rubbers. Synthetic rubbers that can be vulcanized include polymers of 1,3-butadienes, for example of 1,3-butadiene itself and of isoprene, and copolymers of 1,3-butadienes with other monomers, for example styrene, acrylonitrile, isobutylene or methyl methacrylate.

In the vulcanization process, the accelerators are usually used in conjunction with sulfur by which is meant either elemental sulfur or a sulfur-containing vulcanizing agent, for example an amine disulfide, and with other commonly used ingredients, for example zinc oxide, stearic acid, a filler and an antioxidant.

The additives can be incorporated into unvulcanized rubber by conventional means, using for example an internal mixer, a roll mill or by adding a solution or suspension to a rubber latex, giving a mixture which is subsequently vulcanized at an elevated temperature. This temperature is one that is appropriate to the particular rubber concerned, for example a temperature of about 135°–155° C. where the composition is based on natural rubber, or a temperature of about 140°–160° C. where the composition is based on a styrene-butadiene rubber.

The amount of accelerator used depends on a number of factors, including for example the type of rubber and the use for which the vulcanized product is required. The amount is, however, usually within the range 0.3 to 5 parts by weight per 100 parts by weight of rubber, for example 0.5, 1.0 or 1.5 parts by weight.

Conventional amounts of the other additives referred to above can be used.

The invention is illustrated in the following examples.

Example 1

This example describes the production of sodium thiomorpholinocarbodithioate and bis(thiomorpholinothiocarbonyl) disulfide.

7.6 grams (0.1 mol.) of carbon disulfide was added over a period of 10 minutes to a stirred solution of 10.3 grams (0.1 mol.) of thiomorpholine and 4.0 grams (0.1 mol.) of sodium hydroxide in 44 cc. of water at 10° C. The reaction mixture was then left for 1 hour, during which time the mixture attained room temperature, giving a clear solution of sodium thiomorpholinocarbodithioate.

For the oxidation of this compound, the above solution was diluted with 100 cc. of water, and to it was added, with stirring, a solution of 11.4 grams (0.05 mol.) of ammonium persulfate in 150 cc. of water at a temperature of 20–30° C. After standing for 30 minutes, the solid product, bis(thiomorpholinothiocarbonyl) disulfide, was collected by filtration, washed and dried. The yield of product was 17.6 grams (98.7%) and its melting point was 142°–146° C. This was raised to 148°–149° C. by crystallization from a mixture of butanone and 60–80% petroleum ether. (Found: C, 33.7; H, 4.49; N, 7.87; S, 53.93. $C_{10}H_{16}N_2S_6$ requires C, 33.69; H, 4.30; N, 7.94; S, 54.2%.)

Example 2

This example describes the production of bis(thiomorpholinothiocarbonyl) monosulfide from bis(thiomorpholinothiocarbonyl) disulfide.

A mixture of 12 grams (0.033 mol.) of bis(thiomorpholinothiocarbonyl) disulfide, 120 cc. ethanol, 50 cc. of acetone, 2.2 grams (0.033 mol.) of potassium cyanide and 15 cc. of water was boiled under reflux for 30 minutes.

After cooling to room temperature, the reaction mixture was stirred into 600 cc. of water, and the insoluble solid was collected by filtration, washed and dried. The yield of bis(thiomorpholinothiocarbonyl) monosulfide was 7.5 grams (70%) and its melting point after crystallization from ethanol was 107°–108° C. (Found: C, 37.03; H, 4.94; N, 8.64; S, 49.37. $C_{10}H_{16}N_2S_5$ requires C, 37.09; H, 4.83; N, 8.38; S, 49.1%.)

Example 3

Thiomorpholinium thiomorpholinocarbodithioate was obtained by the addition of 7.6 grams (0.1 mol.) of carbon disulfide to 20.6 grams of thiomorpholine, and controlling the temperature below 30° C. The thiomorpholine could have been diluted with water or ethanol if desired.

Example 4

Thiomorpholinothiocarbonyl 2-benzothiazolyl disulfide was obtained by the reaction of sodium thiomorpholino-carbodithioate with 2-benzothiazolyl sulfur chloride in chloroform solution.

Example 5

Thiomorpholinothiocarbonyl 2-benzothiazolyl monosulfide was obtained by warming a mixture of 17.8 grams (0.05 mol.) of bis(thiomorpholinothiocarbonyl) disulfide, 16.6 grams (0.05 mol.) of 2-benzothiazolyl disulfide and 6.5 grams (0.1 mol.) of potassium cyanide in aqueous acetone until the solids went into solution and then allowing the product to crystallize.

Example 6

This example describes tests used in making an assessment of the accelerator properties of certain of the new compounds described in the previous examples, and shows that each accelerated the vulcanization of a white rubber stock. For comparison, the results given by the morpholine analogues of the sulfides of Examples 1 and 2 are included.

A masterbatch of the following composition was prepared by compounding on a mill:

| | Parts by wt. |
|---|---|
| Pale crepe | 100 |
| Zinc oxide | 3 |
| Stearic acid | 1 |
| Sulfur | 2.5 |

Five portions of the masterbatch were taken, and into each was incorporated by milling one of the accelerators under test in an amount equivalent to 2 parts by weight per 100 parts by weight of rubber. A sixth portion of the masterbatch was used as a control.

Each mix was allowed to stand for 24 hours before being tested.

In one test method, a sample of the mix under test was placed in a Mooney plastometer fitted with a "large" rotator, according to British specification No. 1,673, part 3, 1951. The time taken for the reading of the instrument to increase to 100 units at a temperature of 140° ±1° C. was recorded, this time being inversely related to the accelerator activity of the compound under test.

In a second test method, the degree of vulcanization of a mix after various cure times at 160° C. was determined by measuring the extent to which a cured sample swelled on immersion in benzene for 24 hours at room temperature, the extent of swelling being inversely proportional to the degree of vulcanization. The procedure was that of British Standard Specification 903, part A16, method C, using strips cured in 1 mm. x ½ inch x 4 inch moulds.

The results given in the table below show the accelerator activity of bis(thiomorpholinothiocarbonyl) mono- and di-sulfides and that these compounds have a faster rate of cure under the test conditions than their morpholine analogues.

| Accelerator | Mooney Plastometer Time to reach 100 units (minutes) | Percent linear swelling in benzene Cure time (minutes) | | |
|---|---|---|---|---|
| | | 7.5 | 15 | 30 |
| Bis(thiomorpholinothiocarbonyl) disulfide | 7.75 | 68 | 71 | 74 |
| Bis(thiomorpholinothiocarbonyl) monosulfide | 8 | 72 | 73 | 70 |
| Bis(morpholinothiocarbonyl) disulfide | 11 | 75 | 78 | 78 |
| Bis(morpholinothiocarbonyl) monosulfide | 11.5 | 72 | 73 | 76 |
| None | 120 | >150 | 120 | 110 |

It is intended to cover all changes and modifications of the examples of the invention herein chosen for purposes of disclosure which do not constitute departures from the spirit and scope of the invention.

What is claimed is:

1. A process of vulcanizing a sulfur-vulcanizable rubber which comprises heating at vulcanizing temperature diene rubber, sulfur and an accelerating amount of a thiomorpholinocarbodithioic acid derivative having the formula

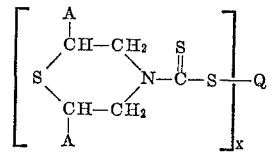

where A is selected from the group consisting of hydrogen and lower alkyl, $x$ is an integer equal to the valence of Q, and Q is selected from the group consisting of metal, ammonium, tri(lower alkyl) ammonium, thiomorpholinium, thiomorpholinothiocarbonylthio, thiomorpholinothiocarbonyl, benzothiazolyl, benzothiazolylthio, 2,6-di(lower alkyl) thiomorpholinium and 2,6-di(lower alkyl) thiomorpholinothiocarbonylthio.

2. A process of claim 1 where Q is thiomorpholinothiocarbonylthio.

3. A process of claim 1 where Q is thiomorpholinothiocarbonyl.

References Cited

UNITED STATES PATENTS

| 2,792,394 | 5/1957 | Himel et al. | 260—243 |
| 2,983,726 | 5/1961 | Hendry | 260—243 |
| 3,248,400 | 4/1966 | Flieg et al. | 260—243 |

JOSEPH L. SCHOFER, *Primary Examiner.*

D. K. DENENBERG, *Assistant Examiner.*